United States Patent
Nakagomi et al.

[11] Patent Number: 5,899,190
[45] Date of Patent: May 4, 1999

[54] DIRECT INJECTION TYPE MULTICYLINDER ENGINE

[75] Inventors: Akira Nakagomi; Jun Otsuka, both of Fujisawa, Japan

[73] Assignee: Isuzu Motors Limited, Tokyo, Japan

[21] Appl. No.: 08/986,792

[22] Filed: Dec. 8, 1997

[30] Foreign Application Priority Data

Dec. 13, 1996 [JP] Japan .................................. 8-352431

[51] Int. Cl.⁶ .................................................. F02M 55/02
[52] U.S. Cl. .................................................. 123/470
[58] Field of Search .............................. 123/470, 468.9, 123/90.27

[56] References Cited

U.S. PATENT DOCUMENTS

| | | |
|---|---|---|
| 3,527,263 | 9/1970 | Carney et al. . |
| 3,945,353 | 3/1976 | Dreisin . |
| 4,149,496 | 4/1979 | Palma ...................................... 123/470 |
| 4,206,725 | 6/1980 | Jenkel et al. ............................ 123/470 |
| 4,422,426 | 12/1983 | Tsugekawa et al. .................... 123/470 |
| 4,901,700 | 2/1990 | Knight et al. ........................... 123/470 |
| 5,566,658 | 10/1996 | Edwards et al. ........................ 123/470 |
| 5,697,345 | 12/1997 | Genter et al. ........................... 123/470 |

FOREIGN PATENT DOCUMENTS

| | | |
|---|---|---|
| 0751290 | 1/1997 | European Pat. Off. . |
| 4-101018 | 4/1992 | Japan . |
| 8-254167 | 10/1996 | Japan . |
| 0736446 | 9/1955 | United Kingdom . |

OTHER PUBLICATIONS

Japan Abstract, Mounting structure of injector, vol. 097, No. 002, Feb. 28,1997.

*Primary Examiner*—Thomas N. Moulis
*Attorney, Agent, or Firm*—Browdy and Neimark

[57] ABSTRACT

The present invention provides a direct injection type multicylinder engine capable of reducing the dimensions and number of parts thereof by forming so as to be used in common the cam brackets for retaining cam shafts, clamp members for fixing adjacent injectors, and fixing stud bolts. The cam brackets comprise singly formed parts, and retain the cam shafts rotatably on a cylinder head. The clamp members are adapted to fix adjacent injectors to the cylinder head at once. The cam brackets and clamp members are fixed to the cylinder head by inserting first common stud bolts through the central portions of the cam brackets and those of the cam brackets. The engine can be miniaturized by reducing the distance between the cam shafts, and the number of the parts required to retain the injectors and cam shafts is reduced.

9 Claims, 3 Drawing Sheets

DIRECT INJECTION TYPE MULTICYLINDER ENGINE

BACKGROUND OF THE INVENTION

1. Field of the Invention

This invention relates to an injector mounting structure for engines, adapted to fix injectors in a cylinder head of an engine, especially, a direct injection type engine.

2. Description of the Prior Art

In recent years, a DOHC engine having two cam shafts per cylinder and two suction valves or exhaust valves on each cam shaft, and a multi-valve engine have been becoming leading engines for meeting the requirements for improving the suction and exhaust efficiencies of engines, increasing the rotational speed and an output level thereof and minimizing the fuel consumption thereof. In such an engine, injectors are provided in a cylinder head so that one injector is opposed to a substantially central portion of one cylinder, and also two parallel-arranged cam shafts so as to hold one injector therebetween, each injector being positioned in the center of a region surrounded by two suction valves or exhaust valves provided on each cam shaft. An example of an engine having injectors arranged in this manner is disclosed in Japanese Patent Laid-Open No. 101018/1992.

In the engine disclosed in this publication, a mechanism for operating suction valves and exhaust valves comprises a cam rotated by a cam shaft, and a rocker arm contacting the cam and converting the action of the cam into reciprocating movements of the suction and exhaust valves. Therefore, a large space is required above a cylinder head to hold the valve operating mechanism therein, and this causes the dimensions of the engine to increase. A bracket is prepared for each cam shaft, and fixed to the cylinder head by two bolts so as to retain the cam shaft. The fixing of each injector to the cylinder head is also done by using other bolts. Consequently, the number of parts used in conjunction with the injectors and cams, such as brackets and bolts for fixing the same and injector fixing bolts increases to cause the cost of the engine to increase.

The applicant of the present invention proposed (refer to Japanese Patent Laid-Open No. 254167/1996) a structure capable of rationally utilizing a space above a cylinder head in a DOHC multi-valve direct injection type engine having a center nozzle structure in which injectors are provided in the centers of regions surrounded by suction and exhaust valves. This structure is characterized in that a cam bracket fixing bolt and an injector clamp member fixing bolt are united with each other, and this can reduce a space required to fix the injectors. According to this structure, a cam shaft can be fixed in a position lower than that in the structure disclosed in Japanese Patent Laid-Open No. 101018/1992, and the opening and closing of the suction and exhaust valves are done by using cams which directly work on these valves, so that rocker arms may not be used. This enables the space saving to be effected above the cylinder head, and the number of parts to be reduced.

In this direct injection type DOHC 4-valve diesel engine, these various advantages are produced but the following problems remain in a structure for fixing injectors to the cylinder head by clamps.

(1) Since a cam bracket is disposed on an imaginary line passing the center of a cylinder and orthogonally crossing cam shafts, it is difficult to reduce the distance between the axes of the two cam shafts. A cam bracket fixing bolt and an injector clamp member fixing bolt are united with each other but, if the cam bracket is made as a single part to be used in common with the two cam shafts, it interferes with the relative injector. Therefore, the cam shaft is provided separately on each cam shaft. Under the circumstances, two fixing bolts are still necessary for setting each bracket, and also two fixing bolts for securing a cam bracket to the cylinder head are still required to be provided between two cam shafts. As a result, the reduction of an included angle between a suction and exhaust valve is restricted, and it is under apprehension that a required compression ratio is secured when this structure is applied to a diesel engine. If the suction/exhaust valve included angle is set close to zero forcibly, the diameters of the ports of the suction and exhaust valves necessarily become smaller to cause the volumeric efficiency of the engine to decrease, and a pumping loss to increase. Since the distance between the axes of the cam shafts cannot be reduced, a correspondingly wide space is required above the cylinder head, so that it is difficult to meet the demand for forming the structure more compactly.

(2) Each cam shaft is fixed by a separately provided independent cam bracket, and each injector to a cylinder head by a single clamp member. Four bolts are required for each cam bracket and each clamp member. Accordingly, the number of parts is still large, and reducing the cost is difficult.

SUMMARY OF THE INVENTION

An object of the present invention is to provide a direct injection type multi-cylinder engine wherein a pair of cam shafts are disposed in parallel with each other above a cylinder head with a plurality of injectors arranged between cam shafts so that the injection ports of the injectors are opposed to substantially the central portion of the combustion chambers in the engine, a cam bracket as a single part laid between adjacent injectors so as to retain two cam shafts and a clamp member by which a pair of adjacent injectors are fixed to the cylinder head being rendered able to be fixed to the cylinder head by one stud bolt.

The present invention relates to a direct injection type multicylinder engine comprising cam shafts disposed in parallel with each other above a cylinder head constituting the engine, injectors provided between the cam shafts, injection ports provided in said injectors being set in combustion chambers in the engine, cam brackets provided adjacently to the injectors so as to retain the cam shafts on the cylinder head, and having first bolt insert holes in the central portions thereof, clamp members having second bolt insert holes in the central portions thereof so as to fix adjacent injectors to the cylinder head, and locking portions at both end sections thereof which are engaged with the injectors, first stud bolts inserted into the first and second bolt insert holes so as to fix the cam brackets and clamp members to the cylinder head, and second stud bolts inserted into the first bolt insert holes so as to fix remaining cam brackets to the cylinder head.

In this direct injection type multicylinder engine, the cam brackets engaged with locking portions provided on the first stud bolts are fixed to the cylinder head by screwing the first stud bolts into threaded holes provided in the cylinder head.

In this direct injection type multicylinder engine, the locking portions provided on the first stud bolts comprise flanges.

The injectors are fixed to the cylinder head by engaging the clamp members with nuts screwed on the first stud bolts, and pressing clamp receiving portions, which are provided on the injectors, by the locking portions provided at both end sections of the clamp members.

Each of the locking portions provided at both end sections of the clamp members is bifurcated, gets astride a relative injector and is engaged with the clamp receiving portion thereof.

The cam brackets are fixed at both end portions thereof to the cylinder head by the second stud bolts screwed to the cylinder head.

Each of the cam shafts is supported rotatably with respect to the cylinder head by a bearing comprising a first bearing portion provided on the cylinder head and a second bearing portion opposed to the first bearing portion and provided on the relative cam bracket.

The injection ports provided in the injectors are set in substantially central portions of the combustion chambers.

The clamp members are positioned above the cam brackets, and all of these parts are fixed by the first stud bolts.

Since this direct injection type multicylinder engine is constructed as described above, the cam brackets, singly formed parts for retaining together the parallel-arranged cam shafts positioned above the cylinder head, and clamp members for fixing adjacent injectors together to the cylinder head are fixed to the portions of the cylinder which are between adjacent injectors by one first stud bolt respectively. Namely, the cam brackets are fixed to the cylinder head by inserting the first stud bolts through the first bolt insert holes formed in the centers of the cam brackets and second bolt insert holes formed in the centers of the clamp members, and fixing the first stud bolts to the cylinder head, while the clamp members are engaged with adjacent injectors, these injectors being then fixed to the cylinder head.

The clamp members are formed so as to be used in common by adjacent injectors, and the cam brackets are formed as singly-made common parts for retaining parallel-arranged cam shafts together, the first stud bolts being also formed so as to be used in common by the clamp members and cam brackets. Since the clamp members, cam brackets and stud bolts are thus formed so as to be used in common, the number of these parts can be reduced, i.e., the number of parts related to the injectors is minimized to enable the cost of the engine to decrease.

Since the fixing stud bolt provided between the parallel-arranged cam shafts and used to fix the clamp members and cam brackets to the cylinder head is only the first stud bolt, the space which cannot be utilized due to the stud bolt is small. Accordingly, the space between the cam shafts can be utilized effectively, the miniaturization of the engine can further be forwarded by reducing the distance between the cam shafts. As a result, the suction/exhaust valve included angle can be set smaller, and a required compression ratio can be secured when the above structure is applied to a diesel engine. Moreover a decrease in the volumeric efficiency of the engine and an increase in a pumping loss can be prevented.

DETAILED DESCRIPTION OF THE EMBODIMENT

An embodiment of the direct injection type multicylinder engine according to the present invention will now be described with reference to the drawings.

Figure 1:
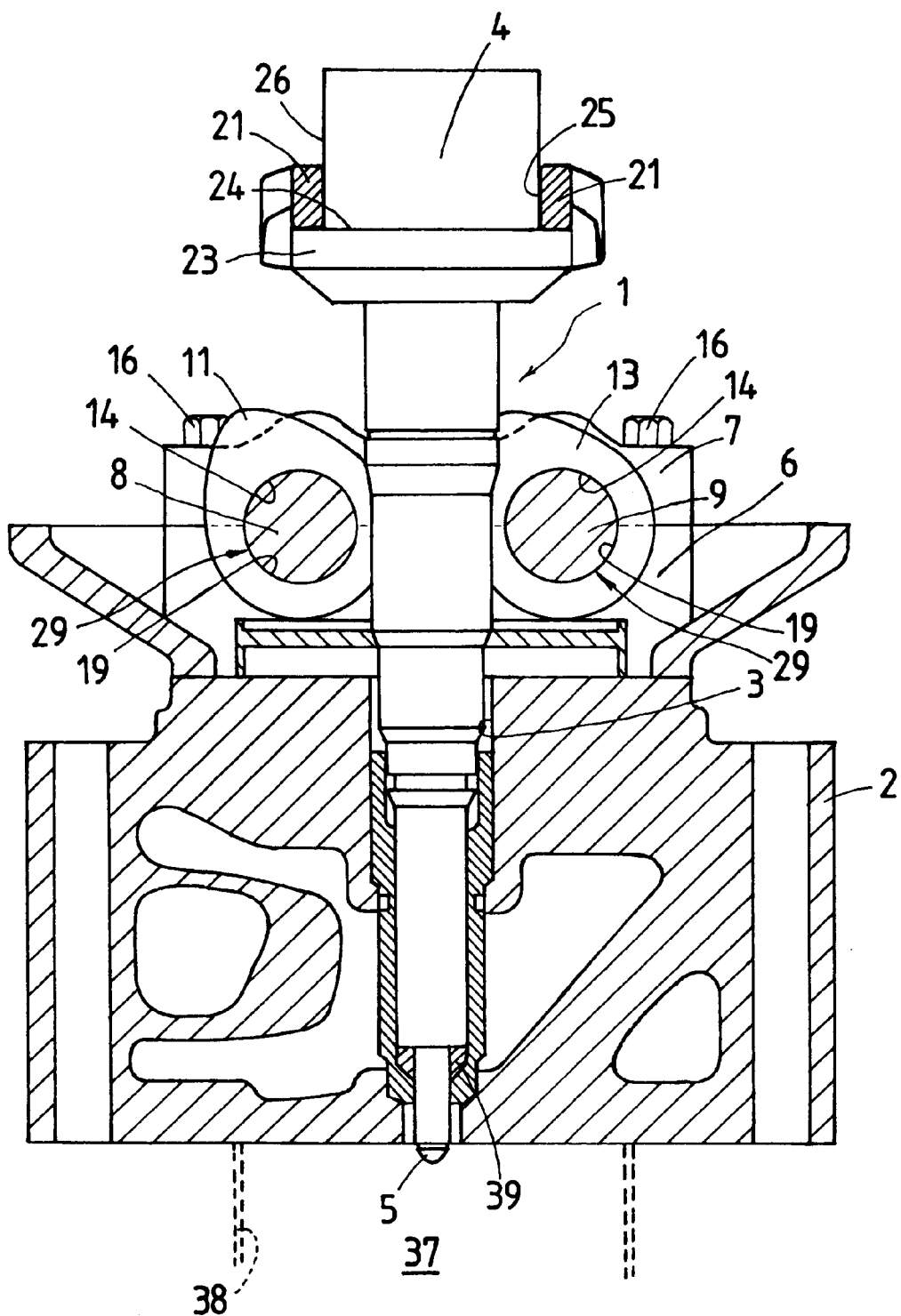
FIG. 1 is a sectional view of a principal portion, which is in an injector fixing position, of the direct injection type multicylinder engine according to the present invention taken along a plane including the line A—A in FIG. 2.
Figure 2:
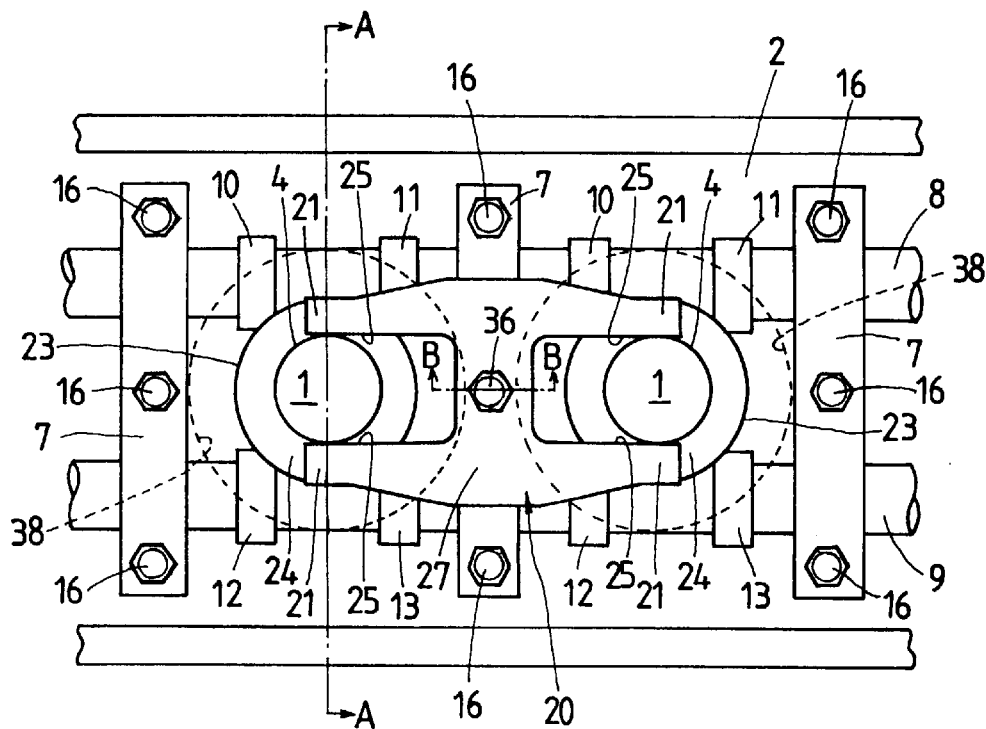
FIG. 2 is a top view of the direct injection type multicylinder engine shown in FIG. 1.

As shown in FIG. 2, this direct injection type multicylinder engine is an engine in which a plurality of cylinder bores 38 are series-arranged between parallel-disposed cam shafts 8, 9 positioned above a cylinder head 2 constituting the engine. In the cylinder head 2, a plurality of injectors 1 are provided in series, each of which is positioned correspondingly to the center of the relative cylinder bore 38. FIG. 1 is a drawing showing the multicylinder engine with a head cover removed therefrom, especially, a section of a principal portion of the multicylinder engine including the injectors 1. Each injector 1 is fixed in a mounting hole 3 in the cylinder head 2. Each injector 1 is inserted in the mounting hole 3 formed in the cylinder head 2, in such a manner that an injection port 5 thereof is opposed to substantially the center of a relative combustion chamber 37, and it is then fixed by a clamp member 20 which will be described later. In the condition in which the injector 1 is fixed by the clamp member 20, a nozzle packing 39 is pressed between the injector 1 and cylinder head 2, whereby a space between the combustion chamber 37 and mounting hole 3 is sealed. This injector 1 is an electromagnetically operated injector having an electromagnetic actuator 4 on an upper portion thereof, and a fuel supply control unit (not shown) controls the operation of the electromagnetic actuator 4, whereby the injection timing and an injection rate of a fuel injected from the injection port 5 into the combustion chamber 37 is controlled.

A cam carrier 6 is fixed on an upper portion of the cylinder head 2 and united therewith, and two parallel-extending cam shafts 8, 9 are retained rotatably between the cam barrier 6 and cam bracket 7. The cam shafts 8, 9 are rotated as they maintain predetermined rotational phase relation. The cam shaft 8 is provided at the portions thereof which are on both sides of one injector 1 with two cams 10, 11. The cam shaft 9 is also provided at the portions thereof which are on both sides of one injector 1 with two cams 12, 13. The injector 1 is disposed in a position which is between the cam shafts 8, 9, and which is in the center of a region surrounded by the four cams 10–13 adapted to drive suction valves and exhaust valves. When the cam shafts 8, 9 are rotated, the cams 10–13 operate two suction valves and two exhaust valves, which correspond to each other, reciprocatingly with respect to one injector, and the supplying of air and the discharging of a combustion gas are thereby done with respect to the combustion chamber 37.

The cam bracket 7 has a pair of bearing portions 14 (FIG. 1) as second bearing portions for rotatably supporting the cam shafts 8, 9. The cam bracket 7 is provided at the central portion thereof and both end portions thereof which are outer than the bearing portions 14 with bolt insert holes 15 into which stud bolts 16 are inserted for fixing the cam bracket 7 to the cylinder head 2. The bolt insert hole 15 formed in the central portion of the cam bracket 7 is a first bolt insert hole used to insert a first stud bolt 30 or a second stud bolt 16, which will be described later, thereinto. Accordingly, one cam bracket 7 is provided with a total of three bolt insert holes 15 including the first bolt insert hole in the central portion and bolt insert holes in both end portions.

The cam carrier 6 is also provided with bearing portions 19 as first bearing portions opposed to the bearing portions 14 of the cam bracket 7, and a bolt insert hole 17 into which the first stud bolt 30 or second stud bolt 16 is inserted. When the first stud bolt 30 or second stud bolt 16 is screwed to threaded hole 35 or 18 formed in the cylinder head 2, the cam bracket 7 engages the cam carrier 6 and is fixed to the cylinder head 2. Consequently, a pair of bearing portions 14 of the cam bracket 7 and a pair of bearing portions 19 of the cam carrier 6 are opposed to each other to form a pair of bearings 29, by which the cam shafts 8, 9 are retained rotatably on the cylinder head 2. The cam bracket 7 is a single common part with respect to the cam shafts 8, 9, and can retain the cam shafts 8, 9 rotatably while maintaining the distance between the axes thereof at a constant level.

Two adjacent injectors 1, 1 are fixed to the cylinder head 2 by a clamp member 20 as a single part. As may be understood from FIG. 2, the clamp member 20 has a substantially H-shaped form in plan. The clamp member 20 has bifurcated locking portions 21 in relation to the injectors 1. Each injector 1 is provided with a clamp receiving portion 23 with which the relative locking portion 21 is engaged in a saddled state. A pressing surface 22 of the locking portion 21 can be engaged with a flat shelf-like clamp receiving surface 24 of the clamp receiving portion 23. The side surfaces 25 of the locking portion 21 can be fitted around a circumferential surface 26 of the electromagnetic actuator 4 on each injector 1. When the clamp member 20 is fixed to the cylinder head 2, the pressing surface 22 engages the pressure receiving surface 24, and the side surfaces 25 of the locking portion 21 the circumferential surface 26 of the electromagnetic actuator 4. Therefore, two adjacent injectors 1 can be fixed to the cylinder head 2 at once with the posture thereof restrained with respect to each other.

The clamp member 20 is provided at a central portion 27 thereof with a second bolt insert hole 28. The central portion 27 is positioned just above the cam bracket 7 which retains the cam shafts 8, 9. Since position in which the second bolt insert hole 28 is formed is substantially concentric with that in which the first bolt insert hole 15 in the central portion of the cam bracket 7 is formed, a bolt made so as to be used in common, i.e. the first stud bolt 30 which will be described later is inserted into the second bolt insert hole 28 of the clamp member 20 and the first bolt insert hole 15 of the cam bracket 7. Accordingly, between the cam shafts 8, 9, a bolt required to fix the cam bracket 7 and clamp member 20 simultaneously is the first stud bolt 30 only. This enables the number of the parts concerning the fixing of the injectors and the retaining of the cam shafts to be reduced, a space for providing fixing members, such as stud bolts between the cam shafts 8, 9 to be rendered unnecessary, and the engine to be formed more compactly.

The cam brackets 7 other than the cam bracket 7 fixed to the cylinder head 2 with the clamp member 20 by the first stud bolt 30 are fixed to the cylinder head 2 by inserting the second stud bolts 16 into the first bolt insert holes 15 formed in the central portions thereof, and screwing the same bolts into the threaded holes 18. All the cam brackets 7 are fixed at both end portions thereof to the cylinder head 2 by second stud bolts 16. Namely, the second stud bolts 16 are inserted into the bolt insert holes 15 made in both end portions of the cam bracket 7 and the bolt insert holes 17 made in the cam carriers 6, and the threaded portions of the second stud bolts 16 are then screwed into the threaded holes 18 formed in the cylinder head 2, whereby the cam brackets 7 are pressed at both end portions thereof as well against the cylinder head 2 by the head portions of the second stud bolts 16.

Figure 4:
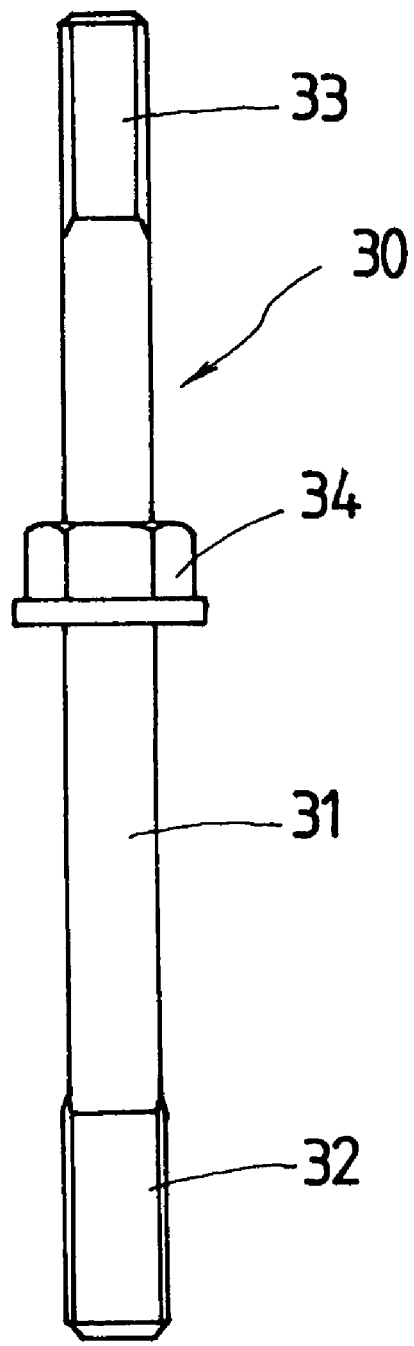
FIG. 4 is a front view of a stud bolt used in the direct injection type multicylinder engine of FIG. 1.

FIG. 4 shows a first stud bolt 30 for fixing the cam bracket 7 and clamp member 20 at once. The stud bolt 30 has a male thread 32 formed in one end portion of an elongated stem 31, a male thread 33 formed on the other end portion of the stem 31, and a locking portion 34 fixed around a substantially longitudinally intermediate portion, which is between the two male threads 32, 33, of the stem 31. The locking portion 34 can comprise a flange made integral with or fixed to the stud bolt 30. The locking portion 34 shown in FIG. 4 comprises a nut welded to the stud bolt 30 but the shape of and a fixing method applied to the locking portion 34 may not be limited to those illustrated.

Figure 3:
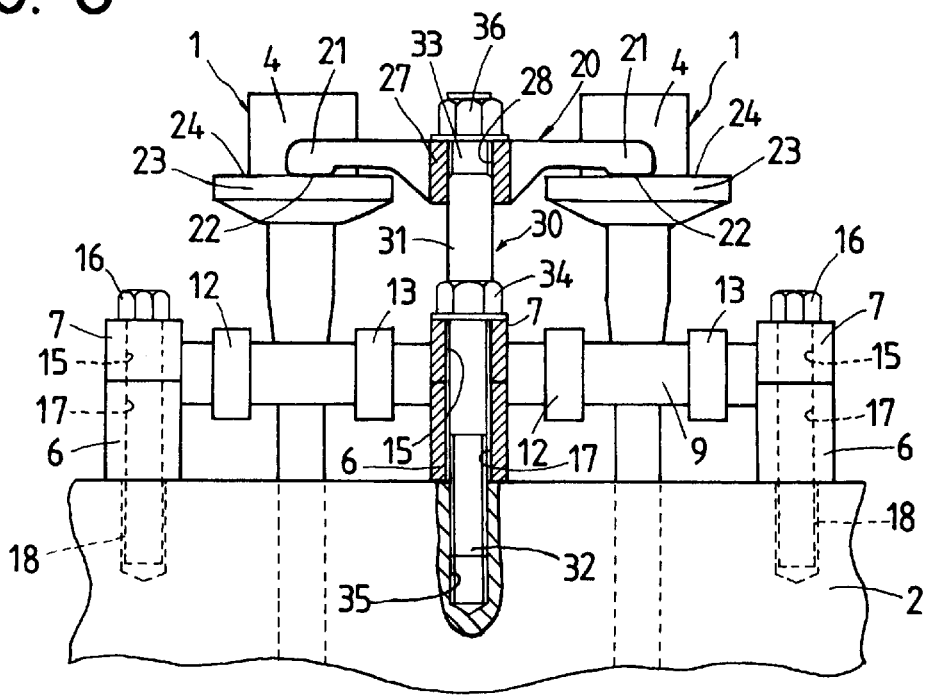
FIG. 3 is a side view of the direct injection type multicylinder engine of FIG. 1, which side view is partially sectioned along a plane including the line B—B in FIG. 2.

The fixing of the cam brackets 7 and clamp member 20 to the cylinder head 2 by using the first stud bolt 30 will now be described. In order to screw the first stud bolt 30 into the bolt hole 35 of the cylinder head 2, the cam bracket 7 is placed on the cam carrier 6 in advance, the first stud bolt 30 is inserted into the first bolt insert hole 15 of the cam bracket 7 and the bolt insert hole 17 of the cam carrier 6 and then screwed into the threaded hole 35 of the cylinder head 2. As shown in FIG. 3, when the first stud bolt 30 is screwed into the cylinder head 2, the male thread 32 engages the threaded hole 35 of the cylinder head 2.

When the first stud bolt 30 is screwed into the cylinder head 2, the locking portion 34 engages an upper surface of the cam bracket 7, which is thereby pressed against the cam carrier 6. The clamp member 20 is then fitted firmly around the first stud bolt 30 via the bolt insert hole 28 of the clamp member 20. The clamp member 20 is set in the condition shown in FIG. 2, in such a manner that the pressing surfaces 22 of the bifurcated locking portions 21 engage the pressure receiving surfaces 24 with the side surfaces 25 of the locking portions 21 fitted around the circumferential surfaces 26 of the electromagnetic actuators 4. When the nut 36 is then screwed on the male thread 33 to engage the nut 36 with the clamp member 20, the clamp member 20 forcibly presses at its locking portions 21 the clamp receiving portions 23 of the injectors 1, whereby the injectors 1 are fixed in the mounting holes 3 of the cylinder head 2.

The injector mounting structure in this embodiment has been described as an injector mounting structure for a multicylinder engine provided with electromagnetically operated injectors having electromagnetic actuators on the upper portions thereof. It is clear that this structure can also be applied to a diesel engine having a general injection system and a cylinder injection type gasoline engine as long as the engine is provided with injectors.

What is claimed is:

1. A direct injection type multicylinder engine comprising cam shafts disposed in parallel with each other above a cylinder head constituting said engine, injectors provided between said cam shafts, injection ports provided in said injectors being set in combustion chambers in said engine, cam brackets provided adjacently to said injectors so as to retain said cam shafts on said cylinder head, and having first bolt insert holes in the central portions thereof, clamp members having second bolt insert holes in the central portions thereof so as to fix adjacent injectors to said cylinder head, and locking portions at both end sections thereof which are engaged with said injectors, first stud bolts inserted into said first and second bolt insert holes so as to fix said cam brackets and clamp members to said cylinder head, and second stud bolts inserted into said first bolt insert holes so as to fix remaining cam brackets to said cylinder head.

2. A direct injection type multicylinder engine according to claim 1, wherein said cam brackets engaged with locking portions provided on said first stud bolts are fixed to said cylinder head by screwing said first stud bolts into threaded holes provided in said cylinder head.

3. A direct injection type multicylinder engine according to claim 2, wherein said locking portions provided on said first stud bolts comprise flanges.

4. A direct injection type multicylinder engine according to claim 1, wherein said injectors are fixed to said cylinder head by engaging said clamp members with said flanges of said first stud bolts, and pressing said clamp receiving portions of said injectors by said locking portions provided at both end sections of said clamp members.

5. A direct injection type multicylinder engine according to claim 4, each of said locking portions provided at both end sections of said clamp members is bifurcated, gets astride a relative injector and is engaged with said clamp receiving portion thereof.

6. A direct injection type multicylinder engine according to claim 1, wherein said cam brackets are fixed at both end portions thereof to said cylinder head by said second stud bolts screwed to said cylinder head.

7. A direct injection type multicylinder engine according to claim 1, wherein said cam shafts are supported rotatably by bearings comprising first bearing portions provided in said cylinder head, and second bearing portions opposed to said first bearing portions and provided in said cam brackets.

8. A direct injection type multicylinder engine according to claim 1, wherein said injection ports of said injectors are set in substantially the centers of said combustion chambers.

9. A direct injection type multicylinder engine according to claim 1, wherein said clamp members are positioned above said cam brackets, said clamp members and said cam brackets being fixed by said first stud bolts.

* * * * *